J. L. DEVLIN.
GAME BOARD AND GAME.
APPLICATION FILED OCT. 4, 1916.
1,211,103.
Patented Jan. 2, 1917.
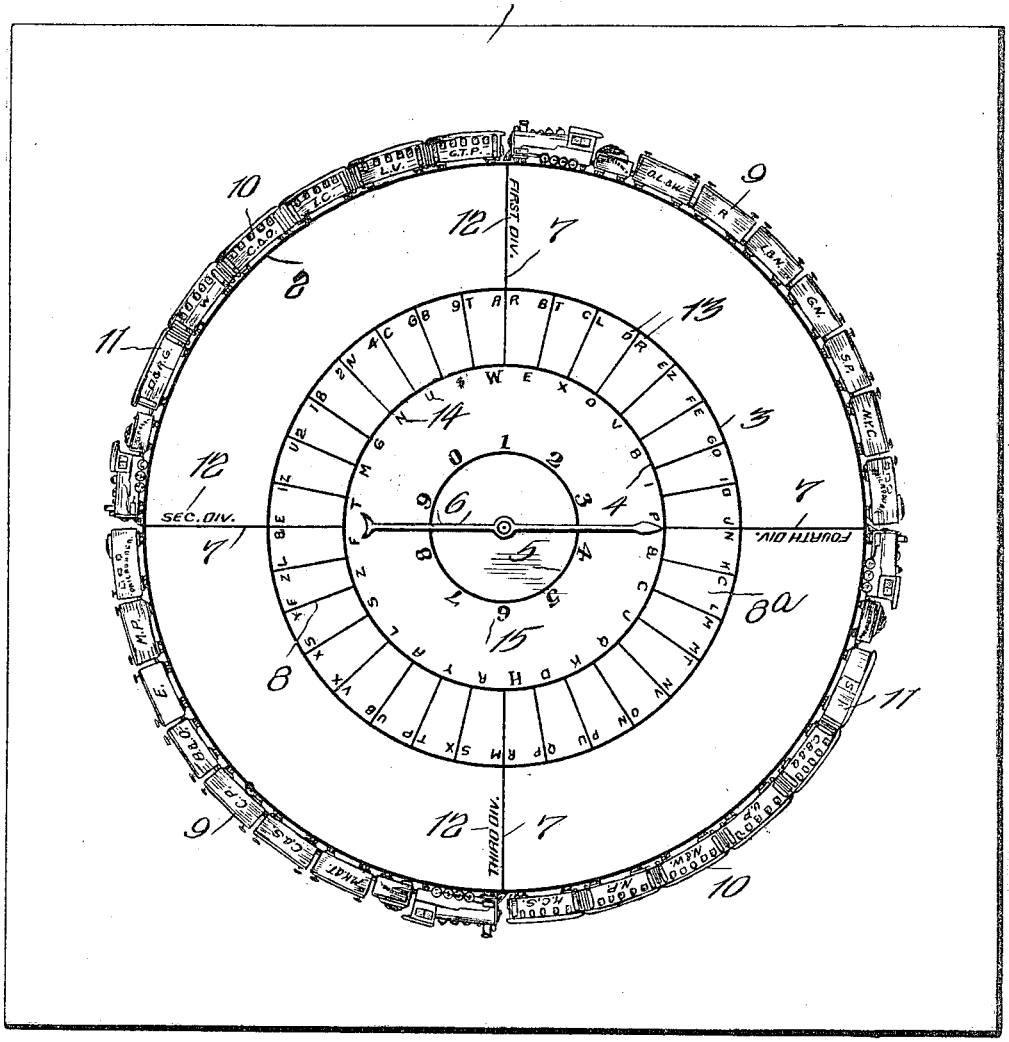
WITNESSES
INVENTOR
JOSEPH L. DEVLIN,
BY
ATTORNEYS

UNITED STATES PATENT OFFICE.

JOSEPH LAWRENCE DEVLIN, OF DENVER, COLORADO.

GAME-BOARD AND GAME.

1,211,103.	Specification of Letters Patent.	Patented Jan. 2, 1917.

Application filed October 4, 1916. Serial No. 123,689.

*To all whom it may concern:*

Be it known that I, JOSEPH L. DEVLIN, a citizen of the United States, and a resident of Denver, in the county of Denver and State of Colorado, have invented a certain new and useful Improvement in Game-Boards and Games, of which the following is a specification.

My invention is an improvement in game boards and games, and has for its object to provide a board of the character specified upon which a variety of games, or variations of the same game, may be played by two or more players.

In the drawings is shown the game board forming the subject of the present invention.

The said board 1 is of cardboard or like suitable material approximately two feet square and of sufficient thickness to be rigid, and one face of the said board is formed into a blackboard, such as used in schools or the like, for permitting the players to mark upon the board with chalk and to erase the said markings after the game.

Upon the board with the center of the board as a center, are drawn circles 2, 3, 4, and 5, and at the center is pivotally mounted an indicator 6, said indicator being mounted to rotate about the center of the concentric circles and having one end formed into a diamond shape and the other into the shape of a crescent as shown. Between the circles 2 and 3 radial lines 7 are drawn, the said lines dividing the space between the concentric circles 2 and 3 into four equal spaces, that is, the lines 7 are at angular intervals of ninety degrees. These lines also coincide with the central lines of the scoreboard 1.

Between the concentric lines 3 and 4 radial lines 8 are drawn, the said lines being spaced at equal distances and being thirty-two in number, and dividing the annular spaces between the two lines into thirty-two equal sub-divisions 8ª.

About the circle 2 and outside of the same, are arranged the representations of four trains, namely, two freight trains 9, and two passenger trains 10, each train being of a length to extend from one line 7 to another line, that is, each train extends over an arc of ninety degrees. It will be noticed that each freight train consists of a locomotive and six freight cars, and a caboose, while each passenger train consists of a locomotive and six passenger cars. Each car in each train is provided with a combination of letters 11 indicating the railroad to which the car belongs, and these indications are preferably the indications of well known railroads, as for instance, Union Pacific or Southern Pacific, and the like.

Adjacent to each line 7 is a legend 12, the legend at the vertical line at the top of the board reading "First Div.", that at the left "Second Div.", that at the bottom "Third Div.", and that at the right "Fourth Div."

Adjacent to each line 8 there is arranged in each compartment 8ª a letter or numeral 13, the said letters and numerals in the two sub-divisions on opposite sides of each line, lying in the circle 3 and at the opposite sides of the lines 8. Just within the circle 4 and, as a consequence between the lines 4 and 5, there is arranged a series of characters 14, the said characters in the present instance being twenty-eight in number and containing letters of the alphabet including "&" and the "$" mark. These characters are arranged between the lines 8 and when the pointer or hand 6 is rotated the spear end thereof will move above these characters. Also in this space between the lines 4 and 5 and just outside of the circle 5, is arranged a series of characters 15, numerals in the present instance, the said numerals being arranged successively from 0 to 9.

The improved game may be played in several different ways, and the accounts may be kept of the games on the surface of the board with chalk. For instance, with the trains 9 and 10, the game may be to ascertain which of the players can correctly interpret the meaning of the greater number of symbols, the four players, for instance, taking turns in calling off the symbols, and in practice the trains will be printed in colors in order to be attractive.

With the symbols 13 which are sixty-four in number, the game may be played with the said letters and numbers as idea suggesters or stimulators. For instance, after the cars have been named, the players may be required to form combinations of letters for the sounds of words, and to obtain the initial letter the pointer will be twirled, the initial letter being that at which the pointer stops. For instance, should the pointer stop at K, this will be the initial letter and the player will be required to add another letter that, with the initial letter, will give the sound of a word, as "K C," Casey, or "K T,"

Katy. The combination of letters may be required to form the designations of articles usually carried in freight cars. For instance, should the pointer for one player stop at "Y," "Y" would be the initial letter and he could add "R," making "wire."

The series 14 of characters may be utilized in the same way as described for the characters 13, and with the characters 15 the game may be varied by providing numbers for the cars depending upon where the pointer stops. Again, base ball may be played with these characters, the numerals representing the innings and the 0 the hazard. For instance, the game may be played as follows: Should the pointer stop at 3, this will indicate that the player twirling the pointer has made one run in the third inning. Should the pointer on his next attempt, stop at 7, his score will be one in the third and one in the seventh, making two. Should the pointer stop at 0, his score for the inning will be 0.

I claim:—

1. A game board comprising a board having formed upon the surface thereof four concentric circles, and having outside the outermost line the representations of four railroad trains, each train covering an arc of ninety degrees, the board having radial lines between the outermost and the next circle and between adjacent trains, the space between the second and third circles being divided by radial lines into thirty-two equal spaces, and each space having a character adjacent to each of the radial lines and near the second circle, the space between the third and fourth circles having near each circle a series of characters, and a pointer pivoted at the center of the circles and adapted to coöperate with the characters, the representations of the trains having the separate cars thereof provided with combinations of letters designating well known railroads, and the playing face of the board having a blackboard surface.

2. A game board comprising a board having formed upon the surface thereof four concentric circles, and having outside the outermost line the representations of four railroad trains, each train covering an arc of ninety degrees, the board having radial lines between the outermost and the next circle and between adjacent trains, the space between the second and third circles being divided by radial lines into thirty-two equal spaces, and each space having a character adjacent to each of the radial lines and near the second circle, the space between the third and fourth circles having near each circle a series of characters, and a pointer pivoted at the center of the circles and adapted to coöperate with the characters.

3. A game board having formed upon the surface thereof concentric circles and having a pointer pivoted at the center of the circles for coöperating therewith, said board having representations of railroad trains arranged in arc-shape about the outermost circle and having radial lines between the said circle and the next inner circle and between adjacent trains, the space within the next inner circle being divided by radial lines, and having characters arranged adjacent to the said lines for coöperating with the pointer.

JOSEPH LAWRENCE DEVLIN.

Witnesses:
  A. E. UPTON,
  GEO. E. MCCLELLAN.